US 8,622,779 B2

(12) United States Patent
Brouillette et al.

(10) Patent No.: US 8,622,779 B2
(45) Date of Patent: Jan. 7, 2014

(54) DRIVESHAFT SEALING FOR A MARINE PROPULSION SYSTEM

(75) Inventors: Steve Brouillette, Sherbrooke (CA); Michel Bourret, Drummondville (CA); Charles Normand, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 363 days.

(21) Appl. No.: 13/173,069

(22) Filed: Jun. 30, 2011

(65) Prior Publication Data

US 2012/0003886 A1 Jan. 5, 2012

Related U.S. Application Data (60) Provisional application No. 61/360,227, filed on Jun. 30, 2010.

(51) Int. Cl.
*B63H 23/34* (2006.01)
*B63H 23/36* (2006.01)
*F16J 15/16* (2006.01)
*F16J 15/34* (2006.01)
*F16J 15/36* (2006.01)

(52) U.S. Cl.
USPC ............. 440/112; 440/83; 277/345; 277/346; 277/361

(58) Field of Classification Search
USPC ............. 440/38, 83, 111, 112; 277/345, 346, 277/352, 361, 365–369, 549, 562; 416/146 A
See application file for complete search history.

(56) References Cited

U.S. PATENT DOCUMENTS

| 3,324,822 | A | 6/1967 | Carter, III |
| 3,993,015 | A | 11/1976 | Klepacz |
| 4,229,010 | A | 10/1980 | St Laurent, Jr. |
| 4,645,463 | A | 2/1987 | Arneson |
| 4,790,782 | A | 12/1988 | McCormick |

(Continued)

FOREIGN PATENT DOCUMENTS

| EP | 0133073 A2 | 2/1985 |
| EP | 1208038 B1 | 7/2004 |
| JP | 10281170 A * | 10/1998 ............... F16D 1/02 |
| JP | 2002321691 | 11/2002 |

OTHER PUBLICATIONS

English abstract of EP 0133073; Feb. 13, 1985.
English abstract of JP 2002321691; Nov. 5, 2002.

*Primary Examiner* — Ajay Vasudeva
(74) *Attorney, Agent, or Firm* — BCF LLP (57) ABSTRACT

A sealing unit longitudinally comprises first and second sealing sub-units disposed around first and second portions of a driveshaft of a marine propulsion system of a watercraft. The first sealing sub-unit is sealingly connected to a front wall of the hull and the engine casing. The second sealing sub-unit is sealingly connected to the driveshaft and a crankshaft. The second sealing sub-unit is disposed at least partially inside the first sealing sub-unit. An inside of the first sealing sub-unit is in fluid communication with a water intake ramp. An inside of the second sealing sub-unit is in fluid communication with an interior of an engine. The first sealing sub-unit prevents fluid communication between the water intake ramp and a portion of an inside of the hull. The second sealing sub-unit prevents fluid communication between the engine, the inside of the hull, and the water intake ramp.

19 Claims, 7 Drawing Sheets

(56) References Cited

U.S. PATENT DOCUMENTS

| | | | |
|---|---|---|---|
| 4,936,593 | A | 6/1990 | Finney |
| 5,254,023 | A * | 10/1993 | Kobayashi ............ 440/38 |
| 5,282,444 | A | 2/1994 | Ito et al. |
| 5,634,831 | A | 6/1997 | Davies et al. |
| 5,639,098 | A | 6/1997 | MacDonald |
| 5,720,638 | A | 2/1998 | Hale |
| 6,039,320 | A | 3/2000 | MacDonald |
| 6,077,135 | A | 6/2000 | Ito |
| 6,083,109 | A | 7/2000 | Gerulski |
| 6,123,620 | A | 9/2000 | Polakowski |
| 6,155,375 | A | 12/2000 | Gierc et al. |
| 6,364,725 | B1 | 4/2002 | Roos |
| 6,428,369 | B1 | 8/2002 | Jones |
| 6,488,553 | B2 * | 12/2002 | Bourret ............ 440/83 |
| 6,524,151 | B1 | 2/2003 | Clemente et al. |
| 6,659,819 | B2 | 12/2003 | Fuse |
| 6,695,656 | B2 | 2/2004 | Fuse et al. |
| 6,872,108 | B2 | 3/2005 | Fuse et al. |
| 6,884,129 | B2 | 4/2005 | Forest et al. |
| 7,431,621 | B2 | 10/2008 | Fuse et al. |
| 7,530,870 | B2 | 5/2009 | Kishimoto et al. |

* cited by examiner

DRIVESHAFT SEALING FOR A MARINE PROPULSION SYSTEM

CROSS-REFERENCE

The present invention claims priority on U.S. Provisional Application No. 61/360,227, entitled 'Driveshaft Sealing for a Marine Propulsion System', filed Jun. 30, 2010, the entirety of which is incorporated herein by reference.

TECHNICAL FIELD

The present invention relates to driveshaft sealing for marine propulsion systems.

BACKGROUND

Some watercraft are powered by one or more water jet propulsion systems. The water jet propulsion system typically consists of a water jet pump which pressurizes water to create thrust. The water is first scooped from under the hull and flows in a water intake ramp to the water jet propulsion system, which expels it through a venturi as a water jet rearwardly of the watercraft. The water jet propulsion system is driven by an engine disposed inside the watercraft.

The water jet pump includes an impeller connected to a driveshaft. The driveshaft, which is operated by the engine, forces the impeller to rotate at high speeds when the watercraft is in operation. The impeller and a portion of the driveshaft are disposed in the water intake ramp surrounded by water, while a remainder of the driveshaft is disposed inside the hull, and connects to the engine. In those watercraft where the driveshaft is connected to the crankshaft by bulky couplings, the driveshaft is typically supported by one or more bearings in the vicinity of a front wall of the water intake ramp formed within the hull. A portion of the hull within the water intake ramp has an aperture equipped with a through-hull fitting through which the driveshaft extends. Typically, the aperture is of larger diameter than the driveshaft, and pressurized water from the intake ramp may flow through the aperture. Also, engine oil within the engine housing and used for lubricating parts of the engine such as the crankshaft bearings alongside the crankshaft through the crankcase cover may, in some cases, leak outside the engine and enter the inside of the hull.

To prevent water and/or engine oil to enter the inside of the hull, the driveshaft may be equipped with one or more sealing units (also called stuffing boxes or stern tubes). The sealing units consist of, for example, one or more ring seals. When sealing units are used to prevent both engine oil and water from flowing, the sealing units are two units separate from each other. One sealing unit is disposed at a portion of the driveshaft by the aperture of the hull receiving the driveshaft for preventing water to flow inside the hull, and another sealing unit is disposed at another portion of the engine housing or crankcase cover to prevent engine oil to flow inside the hull. A remainder of the driveshaft is deprived of sealing units, as it is sometimes equipped with two half jaw type couplings with an elastomeric element in between, which may be too bulky to be incorporated into any of the sealing.

Having two separate sealing units may become bulky, expensive and require space that creates weight distribution challenges within a crowded hull volume. Some sealing units are particularly complex in design and can become difficult to assemble.

Therefore, there is a need for a watercraft and a propulsion system for a watercraft with a sealing unit that would be simple, inexpensive, compact, and that would provide a more reliable sealing as currently available.

SUMMARY

It is an object of the present invention to ameliorate at least some of the inconveniences present in the prior art.

One aspect of the present invention is to provide a jet propulsion system for a watercraft which has a sealing unit for preventing water to enter the inside of the hull and for further preventing fluid communication between the water intake ramp and the interior of the engine. As an alternative to the bulky couplings, a slender crankshaft adapter can be provided at the connection between the driveshaft and the crankshaft. Because the crankshaft adapter can be smaller and lighter than the bulky couplings, the crankshaft adapter can be inserted at least partially in the crankshaft cover (or the engine casing), and the ball bearings can be removed from the driveshaft. Owing in part to this configuration, the inventors have elaborated a compact sealing unit that surrounds a portion of the driveshaft extending between the through-hull fitting and the engine casing.

Therefore, as broadly embodied, the present invention provides a watercraft comprising a hull, and an engine disposed inside the hull. The engine has an engine casing. A crankshaft is disposed at least in part in the engine casing. A marine propulsion unit is operatively connected to the engine for propelling the watercraft. The marine propulsion unit includes a water intake ramp, a driveshaft connected to the crankshaft, and one of an impeller and a propeller operatively connected to the driveshaft. The one of the propeller and the impeller and a portion of the driveshaft are disposed in the water intake ramp. A remainder of the driveshaft is disposed at least partially inside the hull. A front wall is formed at least in part by the water intake ramp. The driveshaft extends through the front wall. A sealing unit is longitudinally disposed between the front wall and the engine. The sealing unit comprises a first sealing sub-unit disposed around a first portion of the remainder of the driveshaft. The first sealing sub-unit has a first end and a second end. The first end is sealingly connected to the front wall. The second end is sealingly connected to the engine casing. An inside of the first sealing sub-unit is in fluid communication with the water intake ramp. The first sealing sub-unit prevents fluid communication between the water intake ramp and a portion of an inside of the hull. A second sealing sub-unit is disposed around a second portion of the remainder of the driveshaft. The second sealing sub-unit has a first end and a second end. The first end is sealingly connected to the driveshaft. The second end is sealingly connected to at least one of the crankshaft and the engine casing. At least the first end of the second sealing sub-unit is disposed longitudinally between the first and second ends of the first sealing sub-unit. At least the first end of the second sealing sub-unit is disposed radially between the driveshaft and at least a portion of the first sealing sub-unit. The second sealing sub-unit prevents fluid communication between the water intake ramp and an interior of the engine.

In a further aspect, an inside of the second sealing sub-unit is in fluid communication with an interior of the engine. The second sealing sub-unit prevents fluid communication between the interior of the engine and the inside of the first sealing sub-unit.

In an additional aspect, the second sealing sub-unit is disposed radially between the driveshaft and the first sealing sub-unit.

In a further aspect, the first sealing sub-unit includes a first flexible boot, and the second sealing sub-unit includes at least one of a second flexible boot and a seal.

In an additional aspect, the second end of the second sealing sub-unit is sealingly connected to the crankshaft, and the second sealing sub-unit is adapted to rotate with the driveshaft and the crankshaft.

In a further aspect, a crankshaft adapter couples the crankshaft to the driveshaft. The crankshaft adapter is located at least partially inside the engine casing. The second end of the second sealing sub-unit is sealingly connected to the crankshaft via the crankshaft adapter.

In an additional aspect, the engine casing comprises a crankcase cover. The crankcase cover covers at least partially a connection between the driveshaft and the crankshaft. The second end of the first sealing sub-unit is sealingly connected to the crankcase cover.

In a further aspect, a through-hull fitting is disposed inside the hull at the front wall where the driveshaft extends therethrough. The through-hull fitting receives a third portion of the remainder of the driveshaft. The first end of the first sealing sub-unit is sealingly connected to the through-hull fitting.

In an additional aspect, the second end of the second sealing sub-unit is sealingly connected to the crankshaft. The second end of the second sealing sub-unit comprises an outward extending lip. The outward extending lip abuts the engine casing. The outward extending lip prevents fluid communication between the water intake ramp and the interior of the engine.

In a further aspect, at least one seal is disposed in the engine casing around the crankshaft longitudinally between the second sealing sub-unit and the engine. The at least one seal prevents at least partially fluid communication between the interior of the engine and the water intake ramp.

In an additional aspect, an outer surface of the driveshaft is free of contact with any other element of the marine propulsion unit between at least the front wall and the first end of the second sealing sub-unit.

Another aspect of the invention is to provide a marine propulsion system for a watercraft. The marine propulsion system comprises an engine. The engine has an engine casing. A crankshaft is disposed at least in part in the engine casing. A marine propulsion unit is operatively connected to the engine. The marine propulsion unit includes a water intake ramp, a driveshaft connected to the crankshaft, and one of an impeller and a propeller operatively connected to the driveshaft. The one of the propeller and the impeller and a portion of the driveshaft are disposed in the water intake ramp. A front wall is formed at least in part by the water intake ramp. The driveshaft extends through the front wall. A remainder of the driveshaft is disposed at least partially between the front wall and the engine. A sealing unit is longitudinally disposed between the front wall and the engine. The sealing unit comprises a first sealing sub-unit disposed around a first portion of the remainder of the driveshaft, the first sealing sub-unit having a first end and a second end. The first end is sealingly connected to the front wall. The second end is sealingly connected to the engine casing. An inside of the first sealing sub-unit is in fluid communication with the water intake ramp. The first sealing sub-unit prevents fluid communication between the water intake ramp and a portion of an exterior of the engine casing. A second sealing sub-unit is disposed around a second portion of the remainder of the driveshaft. The second sealing sub-unit has a first end and a second end. The first end is sealingly connected to the driveshaft. The second end is sealingly connected to the crankshaft. At least the first end of the second sealing sub-unit is disposed longitudinally between the first and second ends of the first sealing sub-unit. At least the first end of the second sealing sub-unit is disposed radially between the driveshaft and at least a portion of the first sealing sub-unit. An inside of the second sealing sub-unit is in fluid communication with an interior of the engine. The second sealing sub-unit prevents fluid communication between the interior of the engine and a portion of the exterior of the engine casing. The second sealing sub-unit prevents fluid communication between the interior of the engine and the water intake ramp.

In a further aspect, the second sealing sub-unit is disposed radially between the driveshaft and the first sealing sub-unit.

In an additional aspect, the first sealing sub-unit includes a first flexible boot. The second sealing sub-unit includes at least one of a second flexible boot and a seal.

In a further aspect, the second sealing sub-unit is adapted to rotate with the driveshaft and the crankshaft.

In an additional aspect, a crankshaft adapter couples the crankshaft to the driveshaft. The crankshaft adapter is located at least partially inside the engine casing. The second end of the second sealing sub-unit is sealingly connected to the crankshaft via the crankshaft adapter.

In a further aspect, the engine casing comprises a crankcase cover. The crankcase cover covers at least partially a connection between the driveshaft and the crankshaft. The second end of the first sealing sub-unit is sealingly connected to the crankcase cover.

In an additional aspect, a through-hull fitting is adapted to be disposed inside a hull of the watercraft at the front wall where the driveshaft extends therethrough. The through-hull fitting receives a third portion of the remainder of the driveshaft. The first end of the first sealing sub-unit is sealingly connected to the through-hull fitting.

In a further aspect, the second end of the second sealing sub-unit is sealingly connected to the crankshaft. The second end of the second sealing sub-unit comprises an outward extending lip. The outward extending lip abuts the engine casing. The outward extending lip prevents fluid communication between the water intake ramp and the interior of the engine.

In an additional aspect, at least one seal is disposed in the engine casing around the crankshaft longitudinally between the second sealing sub-unit and the engine. The at least one seal prevents at least partially fluid communication between the interior of the engine and the water intake ramp.

In another aspect, the invention provides a marine propulsion system for a watercraft. The marine propulsion system comprises an engine. The engine has an engine casing. A crankshaft is disposed at least in part in the engine casing. A marine propulsion unit is operatively connected to the engine. The marine propulsion unit includes a water intake ramp, a driveshaft connected to the crankshaft, and one of an impeller and a propeller operatively connected to the driveshaft. The one of the propeller and the impeller and a portion of the driveshaft are disposed in the water intake ramp. A front wall is formed at least in part by the water intake ramp. The driveshaft extends through the front wall. A remainder of the driveshaft is disposed at least partially between the front wall and the engine. A sealing unit is longitudinally disposed between the front wall and the engine. The sealing unit comprises a first sealing sub-unit disposed around a first portion of the remainder of the driveshaft, the first sealing sub-unit having a first end and a second end. The first end is sealingly connected to the front wall. The second end is operatively sealingly connected to the driveshaft. An inside of the first sealing sub-unit is in fluid communication with the water intake ramp. The first sealing sub-unit prevents fluid communication between the water intake ramp and a portion of an exterior of the engine casing. A second sealing sub-unit is disposed around a second portion of the remainder of the driveshaft. The second sealing sub-unit has a first end and a second end. The first end is operatively sealingly connected to the driveshaft. The second end is sealingly connected to at least one of the engine casing and the crankshaft. An inside of the second sealing sub-unit is in fluid communication with an interior of the engine. The second sealing sub-unit prevents fluid communication between the interior of the engine and a portion of the exterior of the engine casing.

In an additional aspect, the first end of the second sealing sub-unit connects to the driveshaft via the second end of the first sealing sub-unit.

In a further aspect, a seal pack connecting the first end of the second sealing sub-unit to the driveshaft.

In an additional aspect, the marine propulsion system is adapted to be incorporated in a watercraft.

For purposes of this application, terms related to spatial orientation such as forwardly, rearwardly, left, and right, are as they would normally be understood by a driver of the watercraft sitting thereon in a normal driving position. It should be understood that terms related to spatial orientation when referring to the jet propulsion system alone should be understood as they would normally be understood when the jet propulsion system is installed on a watercraft.

For purposes of this application, 'sealingly connected' refers to a connection that prevents liquid leak.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with respect to a personal watercraft and a boat propelled by a jet propulsion unit. However, it is contemplated that other types of marine propulsion units could be provided, such as, stern drives.

Figure 1:
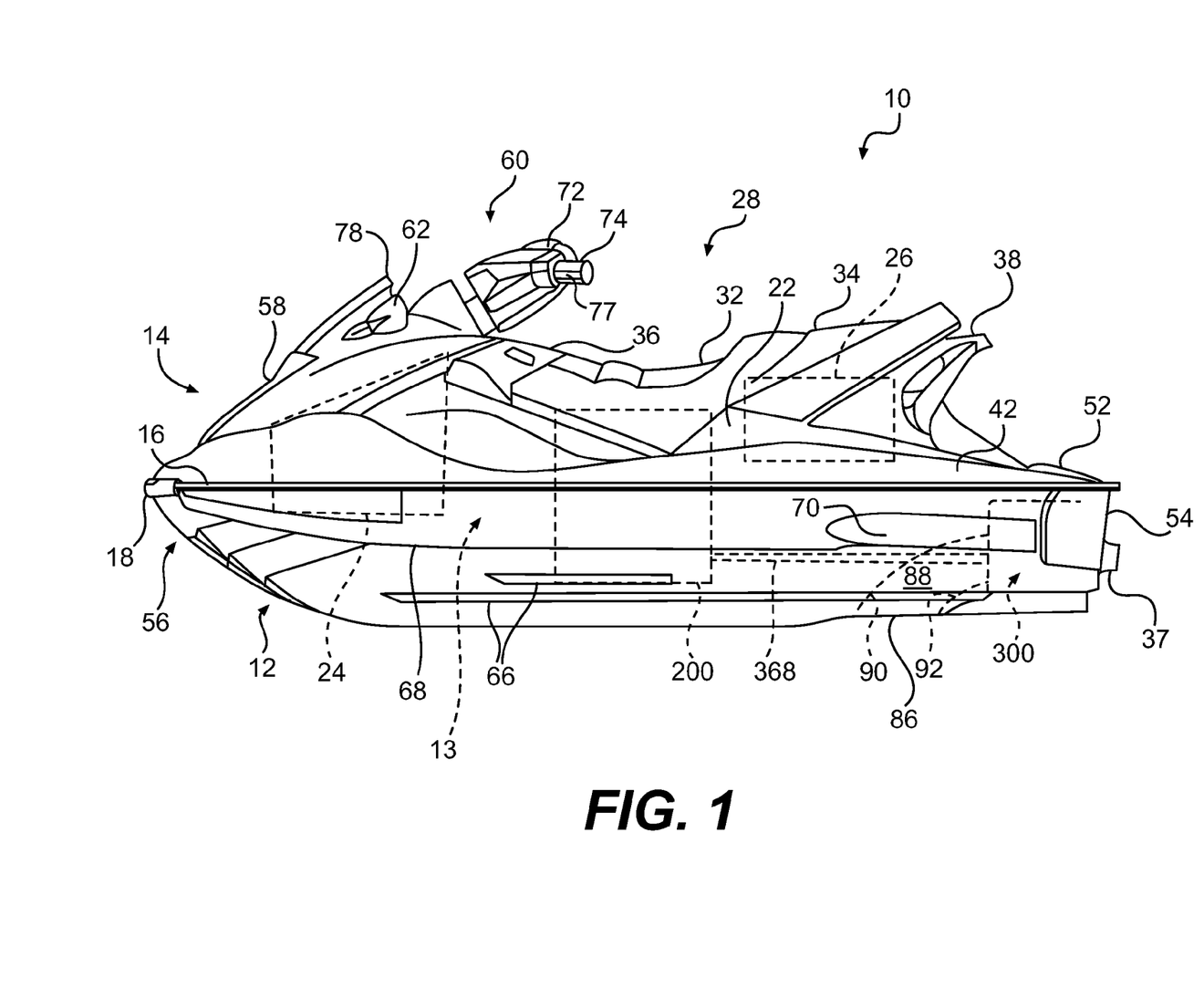
FIG. 1 is a left side elevation view of a personal watercraft.

Referring to FIG. 1, the general construction of a personal watercraft 10 will be described. It should be understood that the personal watercraft 10 could be another type of watercraft, and could have a construction other than the one described.

The watercraft 10 is made of two main parts, including a hull 12 and a deck 14. The hull 12 buoyantly supports the watercraft 10 in the water. The deck 14 is designed to accommodate a rider and, in some watercraft, one or more passengers. The hull 12 and deck 14 are joined together at a seam 16 that joins the parts in a sealing relationship. Preferably, the seam 16 comprises a bond line formed by an adhesive. Other known joining methods could be used to sealingly engage the parts together, including but not limited to thermal fusion, molding or fasteners such as rivets or screws. A bumper 18 generally covers the seam 16, which helps to prevent damage to the outer surface of the watercraft 10 when the watercraft 10 is docked, for example. The bumper 18 can extend around the bow 56, as shown, or around any portion or all of the seam 16.

The space between the hull 12 and the deck 14 forms a volume, referred here as the inside 13 of the hull 12. The inside 13 of the hull 12 accommodates an engine 200 disposed inside an engine casing 203 (shown in FIG. 4), as well as a muffler, tuning pipe, gas tank, electrical system (battery, electronic control unit, etc.), air box, storage bins 24, 26, and other elements required or desirable in the watercraft 10. The engine 200 will be described in greater details below.

The deck 14 has a centrally positioned straddle-type seat 28 positioned on top of a pedestal 22 to accommodate a rider in a straddling position. The seat 28 is sized to accommodate one or more riders. The seat 28 includes a first, front seat portion 32 and a rear, raised seat portion 34 that accommodates a passenger. The seat 28 is preferably made as a cushioned or padded unit or interfitting units. The first and second seat portions 32, 34 are removably attached to the pedestal 22 by a hook and tongue assembly (not shown) at the front of each seat and by a latch assembly (not shown) at the rear of each seat, or by any other known attachment mechanism. The seat portions 32, 34 can be individually tilted or removed completely. One of the seat portions 32, 34 covers an engine access opening defined by a top portion of the pedestal 22 to provide access to the engine 200. The other seat portion (in this case portion 34) covers a removable storage box 26. A "glove compartment" or small storage box 36 is provided in front of the seat 28. A grab handle 38 is provided between the pedestal 22 and the rear of the seat 28 to provide a handle onto which a passenger may hold.

The watercraft 10 has a pair of generally upwardly extending walls located on either side of the watercraft 10 known as gunwales or gunnels 42. The gunnels 42 help to prevent the entry of water in the footrests (not shown) of the watercraft 10, provide lateral support for the rider's feet, and also provide buoyancy when turning the watercraft 10, since personal watercraft roll slightly when turning.

A reboarding platform 52 is provided at the rear of the watercraft 10 on the deck 14 to allow the rider or a passenger to easily reboard the watercraft 10 from the water. Carpeting or some other suitable covering covers the reboarding platform 52. A retractable ladder (not shown) may be affixed to the transom 54 to facilitate boarding the watercraft 10 from the water onto the reboarding platform 52.

The watercraft 10 is provided with a hood 58 located forwardly of the seat 28 and a steering assembly including a helm assembly 60. A hinge (not shown) is attached between a forward portion of the hood 58 and the deck 14 to allow the hood 58 to move to an open position to provide access to the front storage bin 24 (shown schematically). A latch (not shown) located at a rearward portion of the hood 58 locks the hood 58 into a closed position. When in the closed position, the hood 58 prevents water from entering front storage bin 24. Rearview mirrors 62 are positioned on either side of the hood 58 to allow the rider to see behind the watercraft 10. A hook (not shown) is located at the bow 56 of the watercraft 10. The hook is used to attach the watercraft 10 to a dock when the watercraft is not in use or to attach to a winch when loading the watercraft 10 on a trailer, for instance.

An exterior surface of the hull 12 is provided with a combination of strakes 66 and chines 68. A strake 66 is a protruding portion of the hull 12. A chine 68 is the vertex formed where two surfaces of the hull 12 meet. The combination of strakes 66 and chines 68 provide the watercraft 10 with its riding and handling characteristics.

Sponsons 70 are located on both sides of the hull 12 near the transom 54. The sponsons 70 preferably have an arcuate undersurface that gives the watercraft 10 both lift while in motion and improved turning characteristics. The sponsons 70 are preferably fixed to the exterior surface of the hull 12 and can be attached to the hull by fasteners or molded therewith. Sometimes it may be desirable to adjust the position of the sponson 70 with respect to the hull 12 to change the handling characteristics of the watercraft 10 and accommodate different riding conditions.

The helm assembly 60 is positioned forwardly of the seat 28. The helm assembly 60 has a central helm portion 72, which may be padded, and a pair of steering handles 74, also referred to as a handlebar. One of the steering handles 74 is preferably provided with a throttle operator (not shown), which allows the rider to control the engine 200, and therefore the speed of the watercraft 10. The throttle operator can be in the form of a thumb-actuated throttle lever (as shown), a finger-actuated throttle lever, or a twist grip. The throttle operator is movable between an idle position and multiple actuated positions. The throttle operator is preferably biased towards the idle position, such that when the driver of the watercraft lets go of the throttle operator, it will move to the idle position. The other of the steering handles 74 may be provided with a lever 77 used by the driver to control a jet propulsion unit 300 (shown in FIG. 5).

As known, the jet propulsion unit 300 pressurizes water to create thrust. The water is first scooped from under the hull 12 through an inlet 86, which has an inlet grate. The inlet grate prevents large rocks, weeds, and other debris from entering the jet propulsion unit 300, which may damage the system or negatively affect performance. The inlet grate could be omitted. Water flows from the inlet 86 through a water intake ramp 88. The top portion 90 of the water intake ramp 88 is formed by the hull 12, and a ride shoe (not shown) forms its bottom portion 92. Alternatively, the intake ramp 88 may be a single piece or an insert to which the jet propulsion unit 300 attaches. In such cases, the intake ramp 88 and the jet propulsion unit 300 are attached as a unit in a recess in the bottom of hull 12. The jet propulsion unit 300 will be described in greater details below.

The jet propulsion unit 300 may be provided with a reverse gate which is movable between a stowed position where it does not interfere with a jet of water being expelled by the steering nozzle 37 and one or more positions where it redirects the jet of water being expelled by the steering nozzle 37 (described in greater detail below).

A display area or cluster 78 is located forwardly of the helm assembly 60. The display cluster 78 can be of any conventional display type, including a liquid crystal display (LCD), dials or LED (light emitting diodes). The central helm portion 72 has various buttons (not shown), which could alternatively be in the form of levers or switches, that allow the rider to modify the display data or mode (speed, engine rpm, time . . . ) on the display cluster 78. Buttons (not shown) may also used by the driver to control the jet propulsion unit 300. The watercraft 10 includes other features well known in the art that will not be described here.

Figure 2:
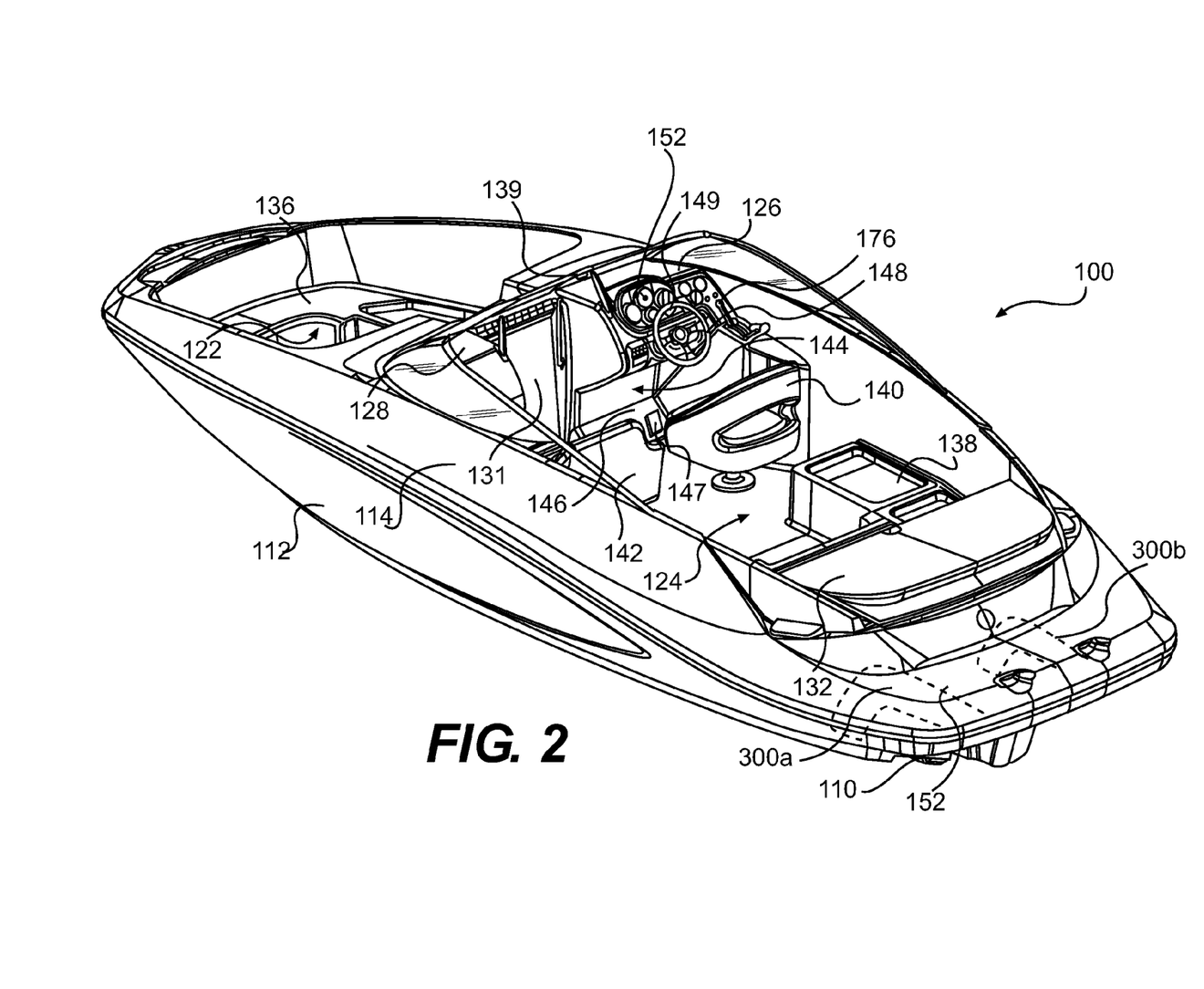
FIG. 2 is a perspective view of a sport boat taken from a rear, left side thereof.

The general construction of a sport boat 100 in accordance with this invention will now be described with respect to FIG. 2. It should be understood that the sport boat 100 could be another type of boat, and could have a construction other than the one described.

The sport boat 100 has a hull 112 and a deck 114 supported by the hull 112. The deck 114 has a forward passenger area 122 and a rearward passenger area 124. A right console 126 and a left console 128 are disposed on either side of the deck 114 between the two passenger areas 122, 124. A passageway 130 disposed between the two consoles 126, 128 allows for communication between the two passenger areas 122, 124. A door 131 is used to selectively open and close the passageway 130.

Two engines (not shown) are located between the hull 112 and the deck 114 at the back of the boat 100. The two engines power two jet propulsion units 300a and 300b. The engines and water jet propulsion units 300a and 300b are of similar construction as the engine 200 and the water jet propulsion unit 300, respectively, of the personal watercraft 10 described above, and will be described in greater details below with respect to the engine 200 and the water jet propulsion unit 300, respectively. It is contemplated that, the boat 100 could have only one engine powering only one jet propulsion system.

Two reverse gates 110 (only one being shown) are operatively mounted to the hull 112. The reverse gates 110 are well known in the art, and will therefore not be described herein. The engines are accessible through a lid 132 located behind the rearward passenger area 124. The lid 132 can also be used as a sundeck for a passenger of the boat 100 to sunbathe on while the boat 100 is not in operation. A reboarding platform 152 is located at the back of the deck 114 for passengers to easily reboard the boat 100 from the water.

The sports boat 100 includes other features, well known in the art that will not be described herein again.

Figure 3:
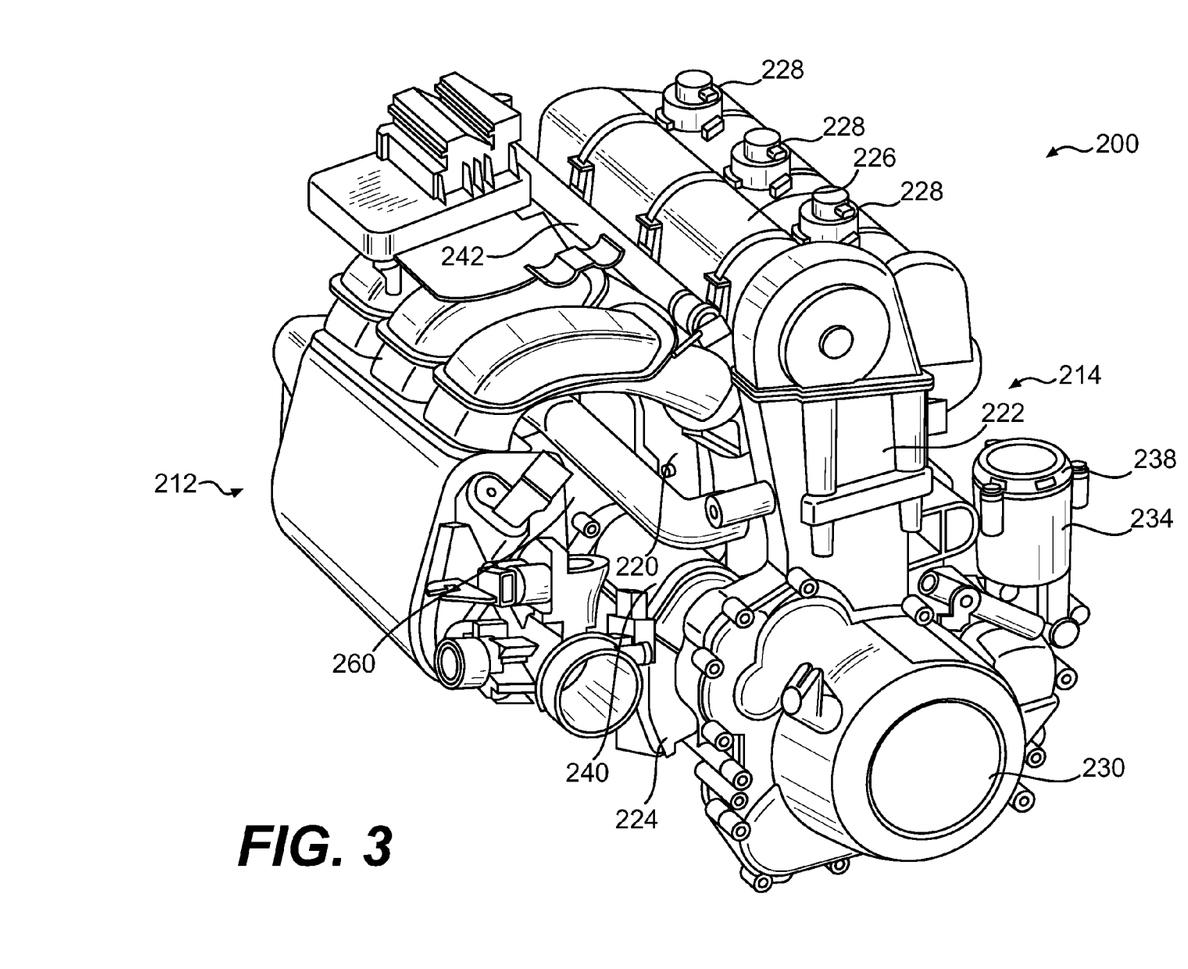
FIG. 3 is a perspective view taken from a front right side of an engine for the watercraft of FIG. 1.
Figure 4:
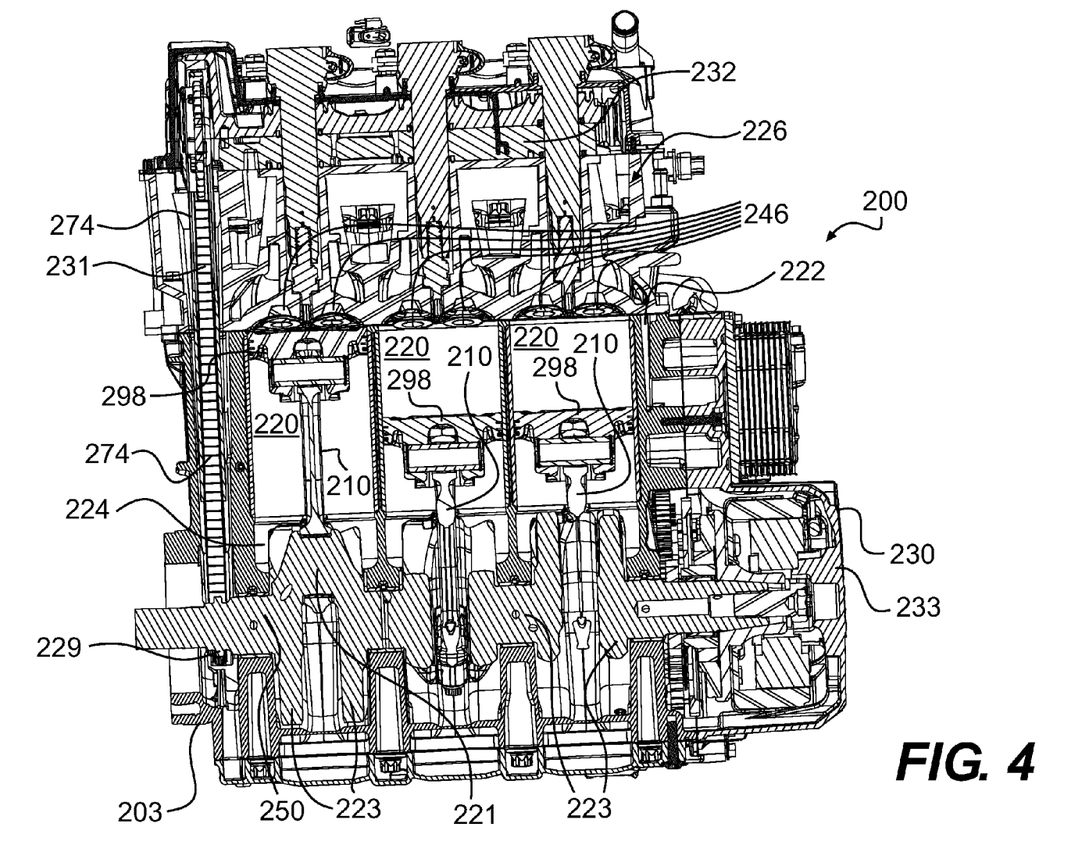
FIG. 4 is a cross-sectional view of the engine of FIG. 3 taken through a vertical plane passing through an axis of rotation of a crankshaft of the engine.

Turning now to FIGS. 3 and 4, the engine 200 will be described in greater detail. The engine of the sport boat 100 has a construction similar to that of the engine 200, and will therefore not be described here. The engine 200 is only one possible engine that could be used. It is contemplated that other types of engines could be used.

The engine 200 has three cylinders 220 disposed in a straight line next to each other. It is contemplated that a greater or fewer numbers of cylinders 220 could be used. All of the cylinders 220 are formed in a cylinder block 222, which sits atop a crankcase 224. A cylinder head assembly 226 sits atop the cylinder block 222. A spark plug 228 is provided in the cylinder head assembly 226 for each cylinder 220. A magneto cover 230 is bolted to the crankcase 224 on the first end of the engine 200 to cover a magneto 233 (shown in FIG. 4) and other components of the engine 200. An oil filter housing 234 is also provided at the first end of the engine 200 on the same side as exhaust components 214 to house an oil filter (not shown). The oil filter housing 234 has a removable cap 238 provided at the top thereof to allow for easy access to the oil filter, thereby facilitating maintenance of the engine 200. A starter motor 240 is also provided at the first end of the engine 200 alongside the cylinder block 222 on the same side as the intake components 212. The starter motor 240 is an electrical motor which, as is known by those skilled in the art, is operatively connected to a crankshaft 250. The starter motor 240 initiates the rotation of the crankshaft 250 to allow for the initial ignition(s) to occur, which then allows the engine 200 to run. A fuel rail 242 disposed on the air intake components 212 receives fuel from a fuel tank (not shown) and delivers it to three fuel injectors (not shown). Each fuel injector is in fluid communication with the intake passages (not shown) of each cylinder 220. The engine 200 also includes a coolant intake pipe, a coolant exhaust pipe, and a thermostat, well known in the art and not described herein.

An oil tank 260 is connected to the engine 200 on an intake side of the engine 200 below the air intake components 212. The oil tank 260 is shaped such that it follows the contour of the cylinder block 222 and the crankcase 224.

Turning to FIG. 4, a piston 298 is housed inside each cylinder 220 and reciprocates therein. For each cylinder 220, the walls of the cylinder 220, the cylinder head assembly 226 and the top of the piston 298 form a combustion chamber. The pistons 298 are linked to the crankshaft 250, which is housed in the crankcase 224, by connecting rods 210. Explosions caused by the combustion of an air/fuel mixture inside the combustion chambers make the pistons 298 reciprocate inside the cylinders 220 which causes a crankshaft 250 to rotate inside the crankcase 224.

The crankshaft 250 is supported for rotation in the crankcase 224 by five plain bearings (not shown). The crankshaft 250 has three crankpins 221 (only one being shown in FIG. 4) onto which the connecting rods 210 are connected. Each crankpin 221 has a pair of corresponding counterbalance weights 223 (only two being shown in FIG. 4) opposite thereto to counteract the forces generated by the reciprocating pistons 298. The space between the counterbalance weights 223 is selected such that the connecting rod 210 which is connected to the corresponding crankpin 221 can pass therebetween.

A sprocket 229 is disposed on the crankshaft 250. The sprocket 229 engages a timing chain 231, so as to drive a first camshaft 232. The timing chain 231 is disposed at least in part inside a timing chain case 274 located at the end of the engine 200 opposite to the end where the magneto cover 230 is located.

The cylinder head assembly 226 has two camshafts (only a first camshaft 232 being shown). The first camshaft 232 and second camshaft are generally horizontal and parallel to the crankshaft 250. Sprockets (not shown) disposed at one end of the two camshafts engage the timing chain 231 such that the first camshaft 232 and the second camshaft are driven by the sprocket 229 of the crankshaft 250. As they rotate, the camshafts cause intake and exhaust valves of the engine 200 to open and close.

The engine 200 includes other features well known in the art and not described herein.

Figure 5:
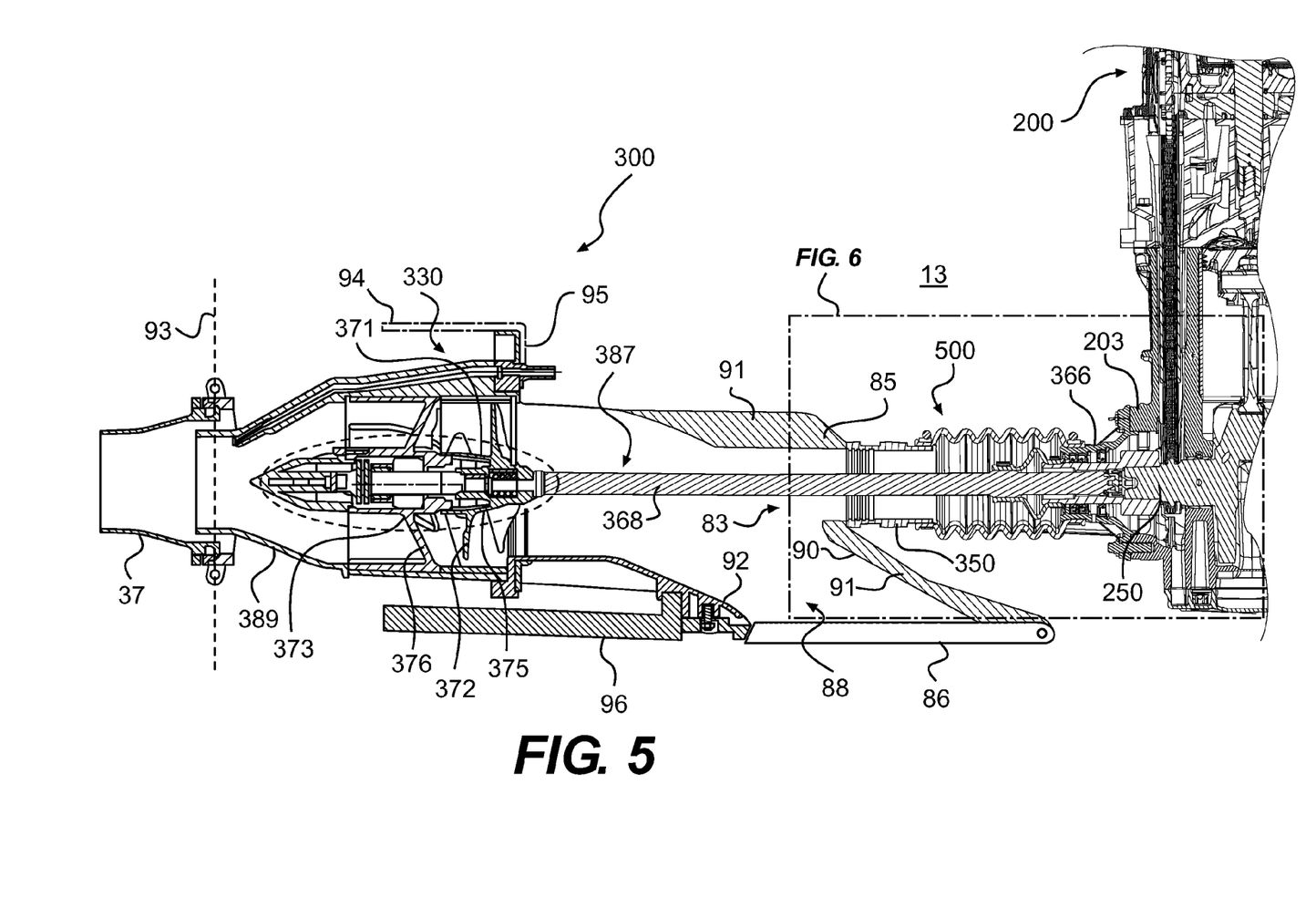
FIG. 5 is a cross-sectional view of a jet propulsion system for the watercraft of FIG. 1, and of a rear portion of the engine of FIG. 3.

Turning to FIG. 5, the water jet propulsion unit 300 will now be described in greater detail. The water jet propulsion units 300*a*, 300*b* of the sports boat 100 have a similar construction.

As mentioned above, the jet propulsion unit 300 pressurizes water to create thrust. The jet propulsion unit 300 is partially located in a formation in the hull 12, referred to as the tunnel 94. The tunnel 94 is defined at the front, sides, and top by walls formed by the hull 12 and is open at the transom 54 (shown in FIG. 1). The bottom of the tunnel 94 is closed by a ride plate 96. The ride plate 96 creates a surface on which the watercraft 10 rides or planes at high speeds. This configuration reduces the projection of the jet propulsion unit 300 from the back of the watercraft 10.

The jet propulsion unit 300 includes a jet pump 330. The forward end of the jet pump 330 is connected to a front wall 95 of the tunnel 94. The jet pump includes an impeller 371 and a stator 373. The impeller includes blades 372 that extend from a center portion 375. The impeller 371 is coupled to the engine 200 by a driveshaft 368. An end 368*b* of the driveshaft 368 is operatively connected to the engine 200 via the crankshaft 250, as will be described below. The engine 200 powers the impeller 371, which pressurizes the water. The water then moves over the stator 373 that is made of a plurality of fixed stator blades 376. The role of the stator blades 376 is to decrease the rotational motion of the water so that almost all the energy given to the water is used for thrust, as opposed to swirling the water. Once the water leaves the jet pump 330, it goes through a venturi 389 that is connected to the rearward end of the jet pump 330. Since the venturi's 389 exit diameter is smaller than its entrance diameter, the water is accelerated further, thereby providing more thrust.

The steering nozzle 37 is rotationally mounted relative to the venturi 389, so as to pivot about a steering axis 93. The steering nozzle 37 is operatively connected to the helm assembly 60 preferably via a push-pull cable (not shown) such that when the helm assembly 60 is turned, the steering nozzle 37 pivots about the steering axis 93. This movement redirects the pressurized water coming from the venturi 389, so as to redirect the thrust and steer the watercraft 10 in the desired direction. It is contemplated that the steering nozzle 37 could be omitted, in which case an alternative means may be provided for steering the watercraft 10. For example, the watercraft 10 may alternatively be steered by one or more rudders, or by having two laterally spaced jet pumps that are selectively powered to steer the watercraft 100 in the desired direction.

As mentioned above, the driveshaft 368 is connected to the crankshaft 250 for transmitting the power generated by the engine 200 to the jet propulsion unit 300. The driveshaft 368 extends through the top portion 90 of the water intake ramp 88 into the inside 13 of the hull 12. To that effect, the top portion 90 includes a front wall 91 which has an aperture 83, through which the driveshaft 368 extends. A through-hull fitting 350 extends in an inside 13 of the hull 12 from the front wall 91 and surrounds the aperture 83. The wall 91 has a connecting part 85 around the aperture 83 to connect to the through-hull fitting 350. The through-hull fitting 350 is a tube disposed around a portion of the driveshaft 368. It is contemplated that the through-hull fitting 350 could include more than one tube, as well as other components. It is also contemplated that the connecting part 85 could be omitted. It is contemplated that the through-hull fitting 350 could be omitted, or could be integrally formed with the connecting part 85.

Figure 6:
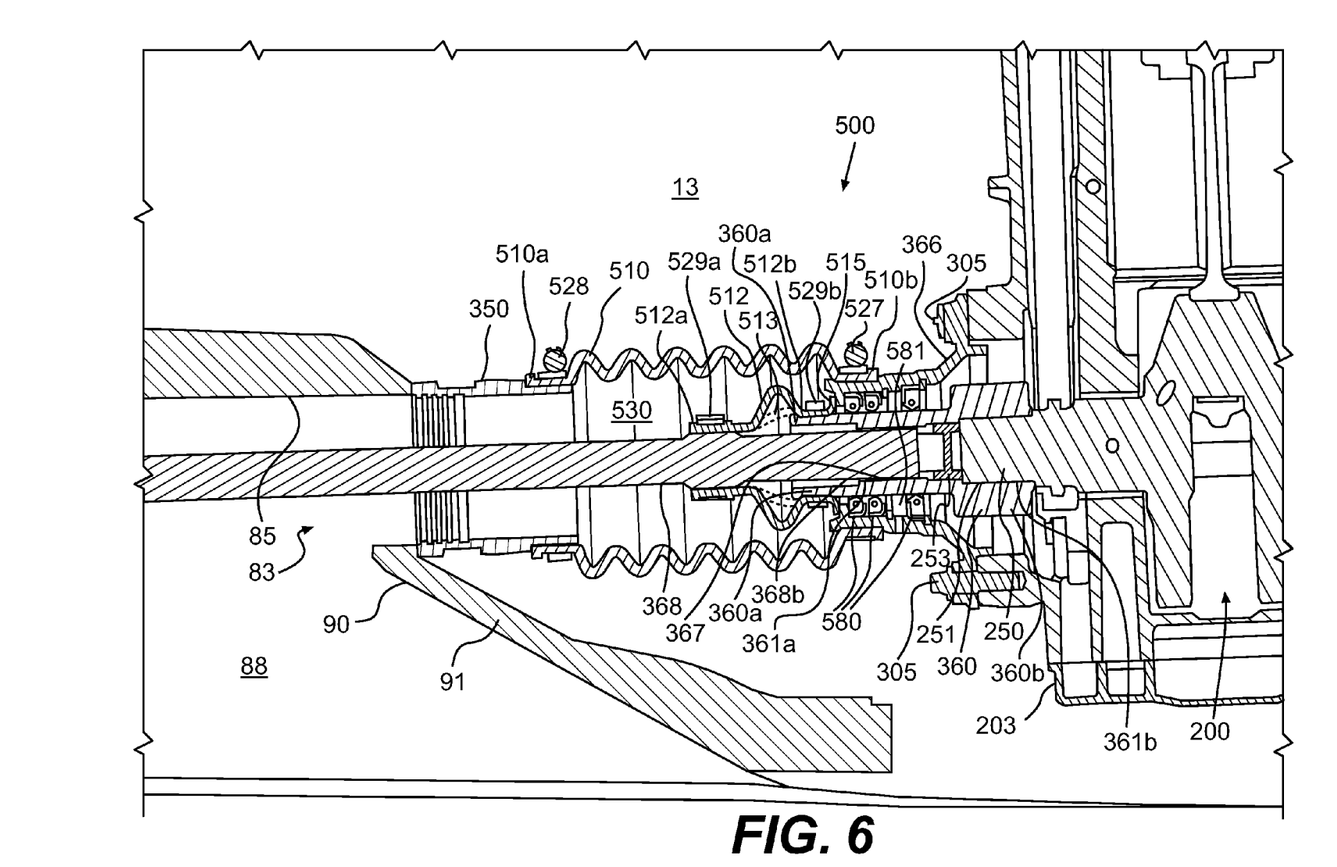
FIG. 6 is a close-up view of the section labelled FIG. 6 in FIG. 5 showing a cross-sectional view of a first embodiment of a sealing unit for the watercraft of FIG. 1.

In a first embodiment of a connection between the driveshaft 368 and the crankshaft 250 shown in FIG. 6, the driveshaft 368 is coupled to the crankshaft 250 via a crankshaft adapter 360. It is contemplated that the crankshaft adapter 360 could be omitted. For example, the driveshaft 368 could be coupled to the crankshaft 250 via complimentary threaded surfaces. It is also contemplated that the driveshaft 368 could be coupled to the crankshaft 250 via complimentary threaded surfaces in addition to the crankshaft adapter 360.

The crankshaft adapter 360 is generally cylindrical. The crankshaft adapter 360 is located partially inside the engine casing 203, and more precisely, partially inside a crankcase cover 366, also referred to as a PTO (Power Take-Off) cover. The crankcase cover 366 will be described below.

The crankshaft adapter 360 has a first end 360*a* and a second end 360*b*. The first end 360*a* extends beyond the crankcase cover 366. It is contemplated that the crankshaft adapter 360 could be completely located inside the crankcase cover 366. The second end 360b of the crankshaft adapter 360 extends partially inside the engine casing 203. It is contemplated that the crankshaft adapter 360 could not extend inside the engine casing 203.

The first end 360a of the crankshaft adapter 360 has female splines 361a engaged with male splines 367 of the end 368b of the driveshaft 368. The splines 367 of the end 368b of the driveshaft 368 are cambered so as to accommodate a degree of relative movement between the crankshaft 250 and the jet pump 330. It is contemplated that the splines 367 of the end 368b of the driveshaft 368 could be cambered. It is also contemplated that the end 368b of the driveshaft 368 could be connected to the first end 360a of the crankshaft adapter 360 in a different manner. The second end 360b of the crankshaft adapter 360 has female splines 361b engaged with male splines 251 of the crankshaft 250. It is contemplated that the second end 360b of the crankshaft adapter 360 could be connected to the crankshaft 250 in a different manner. For example, the second end 360b of the crankshaft adapter 360 could be press-fit to the crankshaft 250.

A rubber piece 253 is located inside the crankshaft adapter 360 between the driveshaft 368 and the crankshaft 250. The rubber piece 253 prevents impacts between ends of the driveshaft 368 and crankshaft 250, which are facing each other. It is contemplated that the rubber piece 253 could be omitted.

The crankcase cover 366 is fixedly connected to the engine casing 203 by bolts 305. It is contemplated that the crankcase cover 366 could be integrally formed with the engine casing 203. It is also contemplated that the crankcase cover 366 could not be part of the engine casing 203.

Figure 7:
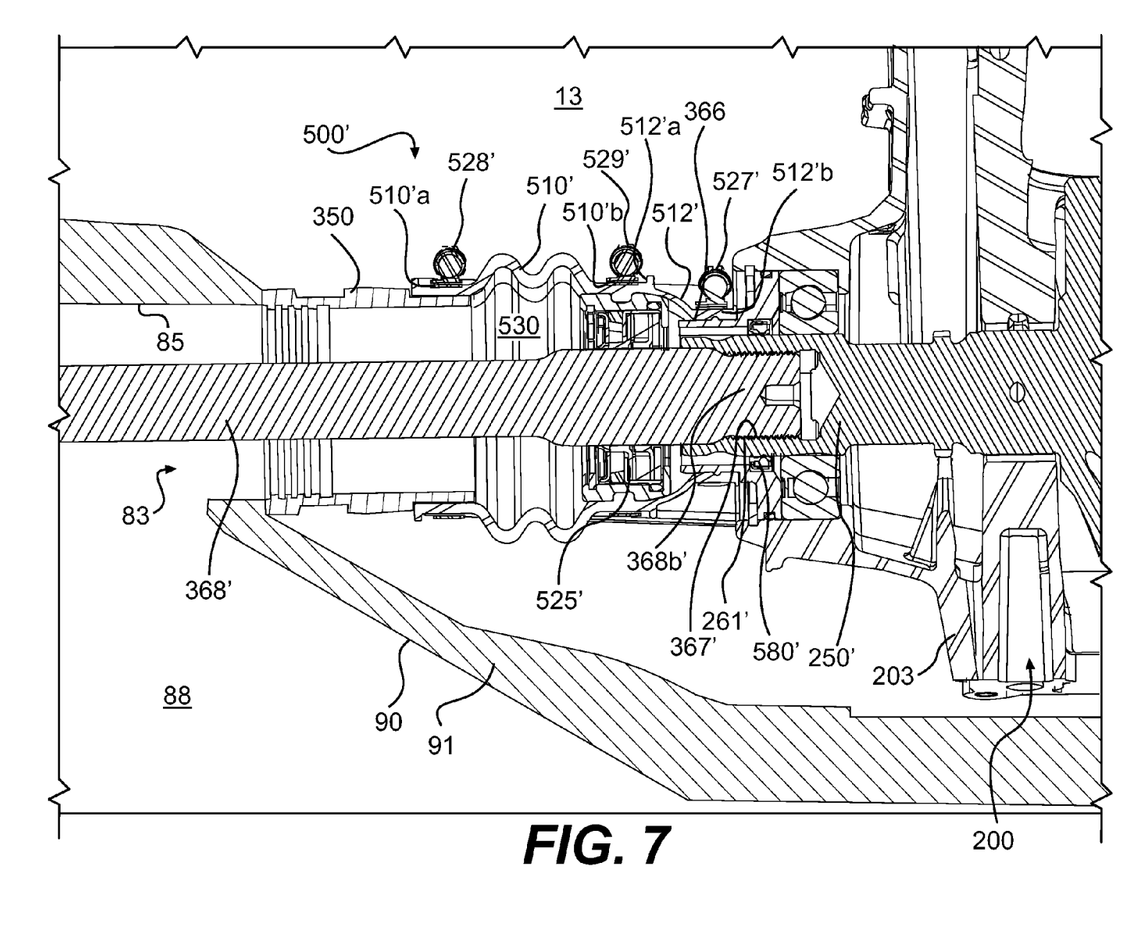
FIG. 7 is a cross-sectional view of a second embodiment of a sealing unit for the watercraft of FIG. 1.

In a second embodiment of a connection between a driveshaft 368' and a crankshaft 250' shown in FIG. 7, the driveshaft 368' is directly threaded into the crankshaft 250'. The driveshaft 368' has outer threads 367' engaged into inner threads 261' of the crankshaft 250'. It is contemplated that the threads 261' of the crankshaft 250' could be outer threads, and the outer threads 367' of the driveshaft 368' could be inner threads. It is also contemplated that the driveshaft 368' and crankshaft 250' could replace the driveshaft 368 and crankshaft 250 in FIG. 6, and reversely, the driveshaft 368 and crankshaft 250 could replace the driveshaft 368' and crankshaft 250' in FIG. 7 such that they would be connected to each other via the adapter 360.

The driveshafts 368 and 368' are surrounded by sealing units 500, 500' respectively. The sealing units 500, 500' provide liquid isolation between, on one hand, the water intake ramp 88 and the inside 13 of the hull 12 (water coming from the water intake ramp 88, entering about the aperture 83 where the driveshaft 368 extends from the hull 12), and on the other hand between the engine 200 and the inside 13 of the hull 12 (engine oil coming from inside the crankcase 224 of the engine 200).

Turning back to FIG. 6, a first embodiment of the sealing unit 500 for the driveshaft 368 will be described.

The sealing unit 500 is disposed around the driveshaft 368 and extends from the through-hull fitting 350 to the engine casing 203.

The sealing unit 500 comprises a first sealing sub-unit and second sealing sub-unit. The first sealing sub-unit includes a first boot 510 and the first sealing sub-unit includes a second boot 512. The first boot 510 and the second boot 512 are disposed around a portion of the driveshaft 368 located in the inside 13 of the hull 12.

The first boot 510 and the second boot 512 are made of rubber. It is contemplated that the boots 510, 512 could be made of a different material. For example, the boots 510, 512 could be made of another type of elastic polymer. The rubber being a flexible material, it allows the boots 510, 512 to expand depending on the amount of fluid present inside or outside the boots 510, 512, which is exerting pressure on the boots 510, 512. The boot 510 is designed to sustain the particular conditions of water flow in the water intake ramp 88. The pressure of the water exerted on the boot 510 varies with the driving conditions of the watercraft 10. The boot 510 allows for these variable conditions.

The boots 510, 512 have a generally annular cross-section. The first flexible boot 510 has a plurality of circumferential ripples along its length, and the second flexible boot 512 has a single circumferential ripple along its length. It is contemplated that the boots 510, 512 could have no circumferential ripples. It is also contemplated that the flexible boots 510, 512 could not be boots. For example, as shown in phantom lines, the flexible boot 512 could be replaced by a tubular seal 513. The tubular seal 513 could be connected to the driveshaft 368 and the crankshaft adapter 360 by friction fit. The tubular seal 513 could be made of rubber stiffer than the one used for the second flexible boot 512. It is contemplated that the tubular seal 513 could be made of a same rubber as the second flexible boot 512 or could be made of a rubber more flexible than the second flexible boot 512. It is contemplated that the tubular seal 513 could be connected to the driveshaft 368 and the crankshaft adapter 360 by other means. For example, the tubular seal 513 could be connected to the driveshaft 368 and the crankshaft adapter 360 by a boot clamp or a spring loaded ring. It is contemplated that the tubular seal 513 could be sufficiently stiff so as to keep the driveshaft 368 from contacting the crankshaft 250, such that the rubber piece 253 could be omitted. The second flexible boot 512 is smaller (in length and diameter) than the first flexible boot 510 and is disposed inside the first flexible boot 510. It is contemplated that the second flexible boot 512 could be disposed only partially inside the first flexible boot 510.

The first flexible boot 510 has a first end 510a connected to the through-hull fitting 350, and a second end 510b connected to the crankcase cover 366. The first end 510a is connected to the through-hull fitting 350 by a boot clamp 528. It is contemplated that the first end 510a could be connected to the through-hull fitting 350 by another type of circumferential clamp (e.g. a worm gear clamp or wire clamp). The second end 510a is connected to the crankcase cover 366 by a boot clamp 527. It is contemplated that the second end 510a could be connected to the crankcase cover 366 by another type of circumferential clamp (e.g. a worm gear clamp or wire clamp). It is also contemplated that the second end 510a could be directly connected to the engine casing 203. Before installation, the first end 510a and the second end 510b have a diameter slightly smaller than a diameter of the through-hull fitting 350 and the crankshaft adapter 360, respectively. During installation, they are stretched over the through-hull fitting 350 and the crankshaft adapter 360, respectively. After installation, a tight fit between the first end 510a and the second end 510b, and the through-hull fitting 350 and the crankshaft adapter 360, respectively, improves fluid isolation. It is contemplated that the first end 510a and the second end 510b could have a diameter that is the same or a diameter slightly larger than the diameter of the through-hull fitting 350 and the crankshaft adapter 360. It is contemplated that the diameter of the first end 510a and the second end 510b could be substantially smaller provided that the material of the first flexible boot 510 be stretched so that the first end 510a and the second end 510b fit over and the through-hull fitting 350 and the crankshaft adapter 360, respectively. It is also contemplated that when the first end 510a and/or the second end 510b have a diameter bigger than the diameter of the through-hull fitting 350 and the crankshaft adapter 360, the ends 510a, 510b could be connected to a connection element, bridging between the ends 510a, 510b and the through-hull fitting 350 and the crankshaft adapter 360, respectively.

The second flexible boot 512 has a first end 512a connected to the driveshaft 368, and a second end 512b connected to the crankshaft adapter 360. The first end 512a is connected to the driveshaft 368 by a spring loaded ring 529a. The second end 512b is connected to the crankshaft adapter 360 by a spring loaded ring 529b. The spring loaded rings 529a, 529b are equilibrated in order to not unbalance the driveshaft 368 during its rotation. It is contemplated that the ends 512a, 512b could be connected to the driveshaft 368 and the crankshaft adapter 360 by other means (e.g. split ring shaft clamp). It is also contemplated that the second end 512b could be connected to the crankcase cover 366. In that case, the second end 512b would be connected to the crankcase cover 366 by a seal pack to allow the second flexible boot 512 to rotate with the driveshaft 368 and the crankshaft 250. A seal pack is an assembly of a plurality of seals that allow relative rotation of their inner and outer races.

The second flexible boot 512 has a lip 515 extending outwardly from the second end 512b. The lip 515 abuts to the engine casing 203 and provides a seal for the water coming in an inside 530 of the first flexible boot 510 toward the engine 200. The inside 530 of the first boot 510 is axially delimited by the first boot 510, the driveshaft 368, and the second flexible boot 512. It is contemplated that, the outward extending lip 515 could also provide a seal for the engine oil coming from an inside of the engine 200. It is contemplated that the lip 515 could be omitted.

Three seals 580 are disposed inside the crankcase cover 366. The seals 580 surround the crankshaft adapter 360 and extend outwardly to connect with the crankcase cover 366. The seals 580 prevent engine oil from flowing from the engine 200 to the inside 13 of hull 12 (or more precisely to the inside 530 of the first flexible boot 510). It is contemplated that more or less than three seals 580 could be used. It is also contemplated that the seals 580 could be omitted or be replaced by other types of seals. The seals 580 are U-cup seals and are biased toward the crankshaft adapter 360 by circumferential springs (not shown). Two of the seals 580 form a recess 581 therebetween. The recess 581 is a channel which collects small amounts of liquid which has leaked through the two seals 580 disposed on the left of the recess 581 (as viewed in FIG. 6), or engine oil which has leaked through the seal 580 disposed on the right of the recess 581 (as viewed in FIG. 6), can collect. Water or oil which accumulates in the recess 581 is drained into a space within the hull 12 via a hole (not shown) extending downward from the recess 581.

Turning now to FIG. 7, a second embodiment of a sealing unit 500' for the driveshaft 368' will be described.

The sealing unit 500' is disposed around the driveshaft 368' and extends between the through-hull fitting 350 and the engine casing 203. The sealing unit 500' comprises a boot 510' and a seal 512'. The boot 510' and seal 512' are integrally formed with each other. It is contemplated that the boot 510' and seal 512' could be two separate sealing sub-units.

The boot 510' is similar to the flexible boot 510. The boot 510' fluidly isolates the inside 13 of the hull 12 from water coming from the water intake ramp 88 via the aperture 83 in the wall 91. The seal 512' has a function similar to that of the second boot 512. Seal 512' fluidly isolates the inside 13 of the hull 12 from engine oil coming from different lubricated parts of the crankshaft 250 and other parts of the engine 200.

The boot 510' and the seal 512' are made of rubber. It is contemplated that the boot 510' and the seal 512' could be made of a different material. For example, the boot 510' and the seal 512' could be made of another type of elastic polymer. The flexible material allows the boot 510' and seal 512' (to a lesser extent) to expand depending on the amount of liquids present inside the boot 510' and seal 512' which are exerting pressure on the boot 510' and seal 512'. The boot 510' has a plurality of circumferential ripples (not shown) along its length. It is contemplated that the boot 510' could have no circumferential ripples.

The boot 510' has a first end 510a' connected to the through-hull fitting 350 by a boot clamp 528', and a second end 510b' connected to the driveshaft 368 via a seal pack 525'. The seal pack 525' connects to the driveshaft 368' by friction fit, and allows the driveshaft 368' to rotate, without inducing rotation of the boot 510' and the seal 512'. It is contemplated that the first end 510a' could be connected to the through-hull fitting 350 by a worm gear clamp or wire clamp. The second end 510b' is connected to the seal pack 525' by a boot clamp 529'. It is contemplated that the second end 510b' could be connected to the seal pack 525' by a worm gear clamp or wire clamp.

The seal 512' has a first end 512a' and a second end 512b'. The second end 512b' is connected to the crankcase cover 366 by a boot clamp 527'. The first end 512a' is adjacent to the second end 510b'. It is contemplated that the second end 512b' could be connected to engine casing 203.

A seal 580' is disposed inside the crankcase cover 366. The seal 580' surrounds the crankshaft 250' and extends outwardly from the crankshaft 250' to connect with the crankcase cover 366. The seal 580' additionally prevents engine oil to enter an inside 530 of the boot 510'. It is contemplated that more than one seal 580' could be used. It is also contemplated that the seal 580' could be omitted or be replaced by other types of seals.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A watercraft comprising:
    a hull;
    an engine disposed inside the hull, the engine having an engine casing;
    a crankshaft disposed at least in part in the engine casing;
    a marine propulsion unit operatively connected to the engine for propelling the watercraft, the marine propulsion unit including:
        a water intake ramp;
        a driveshaft connected to the crankshaft; and
        one of an impeller and a propeller operatively connected to the driveshaft, the one of the propeller and the impeller and a portion of the driveshaft being disposed in the water intake ramp, a remainder of the driveshaft being disposed at least partially inside the hull;
    a front wall formed at least in part by the water intake ramp, the driveshaft extending through the front wall; and
    a sealing unit longitudinally disposed between the front wall and the engine, the sealing unit comprising:
        a first sealing sub-unit disposed around a first portion of the remainder of the driveshaft, the first sealing sub-unit having a first end and a second end, the first end being sealingly connected to the front wall, the second end being sealingly connected to the engine casing, an inside of the first sealing sub-unit being in fluid communication with the water intake ramp, the first sealing sub-unit preventing fluid communication between the water intake ramp and a portion of an inside of the hull; and a second sealing sub-unit disposed around a second portion of the remainder of the driveshaft, the second sealing sub-unit having a first end and a second end, the first end being sealingly connected to the driveshaft, the second end being sealingly connected to at least one of the crankshaft and the engine casing, at least the first end of the second sealing sub-unit being disposed longitudinally between the first and second ends of the first sealing sub-unit, and at least the first end of the second sealing sub-unit being disposed radially between the driveshaft and at least a portion of the first sealing sub-unit, and the second sealing sub-unit preventing fluid communication between the water intake ramp and an interior of the engine.

2. The watercraft of claim 1, wherein an inside of the second sealing sub-unit is in fluid communication with an interior of the engine, and the second sealing sub-unit prevents fluid communication between the interior of the engine and the inside of the first sealing sub-unit.

3. The watercraft of claim 1, wherein the second sealing sub-unit is disposed radially between the driveshaft and the first sealing sub-unit.

4. The watercraft of claim 1, wherein:
the first sealing sub-unit includes a first flexible boot, and
the second sealing sub-unit includes at least one of a second flexible boot and a seal.

5. The watercraft of claim 1, wherein the second end of the second sealing sub-unit is sealingly connected to the crankshaft, and the second sealing sub-unit is adapted to rotate with the driveshaft and the crankshaft.

6. The watercraft of claim 1, further comprising a crankshaft adapter coupling the crankshaft to the driveshaft, the crankshaft adapter being located at least partially inside the engine casing; and
wherein the second end of the second sealing sub-unit is sealingly connected to the crankshaft via the crankshaft adapter.

7. The watercraft of claim 1, wherein the engine casing comprises a crankcase cover, the crankcase cover covers at least partially a connection between the driveshaft and the crankshaft, and the second end of the first sealing sub-unit is sealingly connected to the crankcase cover.

8. The watercraft of claim 1, further comprising a through-hull fitting disposed inside the hull at the front wall where the driveshaft extends therethrough, the through-hull fitting receiving a third portion of the remainder of the driveshaft, the first end of the first sealing sub-unit being sealingly connected to the through-hull fitting.

9. The watercraft of claim 1, wherein:
the second end of the second sealing sub-unit is sealingly connected to the crankshaft,
the second end of the second sealing sub-unit comprises an outward extending lip,
the outward extending lip abuts the engine casing, and
the outward extending lip prevents fluid communication between the water intake ramp and the interior of the engine.

10. The watercraft of claim 1, further comprising at least one seal disposed in the engine casing around the crankshaft longitudinally between the second sealing sub-unit and the engine, the at least one seal preventing at least partially fluid communication between the interior of the engine and the water intake ramp.

11. The watercraft of claim 1, wherein an outer surface of the driveshaft is free of contact with any other element of the marine propulsion unit between at least the front wall and the first end of the second sealing sub-unit.

12. A marine propulsion system for a watercraft, the marine propulsion system comprising:
an engine, the engine having an engine casing;
a crankshaft disposed at least in part in the engine casing;
a marine propulsion unit operatively connected to the engine, the marine propulsion unit including:
a water intake ramp;
a driveshaft connected to the crankshaft; and
one of an impeller and a propeller operatively connected to the driveshaft, the one of the propeller and the impeller and a portion of the driveshaft being disposed in the water intake ramp;
a front wall formed at least in part by the water intake ramp, the driveshaft extending through the front wall, a remainder of the driveshaft being disposed at least partially between the front wall and the engine; and
a sealing unit longitudinally disposed between the front wall and the engine, the sealing unit comprising:
a first sealing sub-unit disposed around a first portion of the remainder of the driveshaft, the first sealing sub-unit having a first end and a second end, the first end being sealingly connected to the front wall, the second end being sealingly connected to the engine casing, an inside of the first sealing sub-unit being in fluid communication with the water intake ramp, the first sealing sub-unit preventing fluid communication between the water intake ramp and a portion of an exterior of the engine casing; and
a second sealing sub-unit disposed around a second portion of the remainder of the driveshaft, the second sealing sub-unit having a first end and a second end, the first end being sealingly connected to the driveshaft, the second end being sealingly connected to the crankshaft, at least the first end of the second sealing sub-unit being disposed longitudinally between the first and second ends of the first sealing sub-unit, and at least the first end of the second sealing sub-unit being disposed radially between the driveshaft and at least a portion of the first sealing sub-unit, an inside of the second sealing sub-unit being in fluid communication with an interior of the engine, the second sealing sub-unit preventing fluid communication between the interior of the engine and a portion of the exterior of the engine casing, and the second sealing sub-unit preventing fluid communication between the interior of the engine and the water intake ramp.

13. The marine propulsion system of claim 12, wherein the second sealing sub-unit is disposed radially between the driveshaft and the first sealing sub-unit.

14. The marine propulsion system of claim 12, wherein:
the first sealing sub-unit includes a first flexible boot, and
the second sealing sub-unit includes at least one of a second flexible boot and a seal.

15. The marine propulsion system of claim 12, wherein the second sealing sub-unit is adapted to rotate with the driveshaft and the crankshaft.

16. The marine propulsion system of claim 12, further comprising a crankshaft adapter coupling the crankshaft to the driveshaft, the crankshaft adapter being located at least partially inside the engine casing; and wherein the second end of the second sealing sub-unit is sealingly connected to the crankshaft via the crankshaft adapter.

17. The marine propulsion system of claim 12, wherein:
the engine casing comprises a crankcase cover,
the crankcase cover covers at least partially a connection between the driveshaft and the crankshaft, and
the second end of the first sealing sub-unit is sealingly connected to the crankcase cover.

18. The marine propulsion system of claim 12, further comprising a through-hull fitting adapted to be disposed inside a hull of the watercraft at the front wall where the driveshaft extends therethrough, the through-hull fitting receiving a third portion of the remainder of the driveshaft, the first end of the first sealing sub-unit being sealingly connected to the through-hull fitting.

19. The marine propulsion system of claim 12, wherein:
the second end of the second sealing sub-unit is sealingly connected to the crankshaft,
the second end of the second sealing sub-unit comprises an outward extending lip,
the outward extending lip abuts the engine casing, and
the outward extending lip prevents fluid communication between the water intake ramp and the interior of the engine.

* * * * *